United States Patent Office 3,200,126
Patented Aug. 10, 1965

3,200,126
3-ALKYL-5-AMINO-2,4-THIAZOLIDINEDIONES
Gerhard Satzinger, Memmingen, Allgau, Germany, assignor to Warner-Lambert Pharmaceutical Company, Morris Plains, N.J., a corporation of Delaware
No Drawing. Filed May 31, 1963, Ser. No. 284,356
2 Claims. (Cl. 260—293.4)

This invention relates to new and novel 5-amino derivatives of 2,4-thiazolidinediones of the formula:

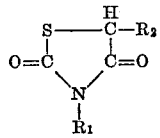

wherein $R_1$ is hydrogen or lower alkyl such as methyl, ethyl or propyl and $R_2$ is di-lower alkylamino or a cyclic amino radical such as piperidino, morpholino, pyrrolidino and the like. The present invention also relates to a new and novel method of preparing the above compounds and to certain novel intermediates disclosed herein which are useful for their production.

The new and novel 5-amino derivatives of 2,4-thiazolidinediones of this invention have been found to have interesting anti-phlogistic pharmacological activity and are both anti-inflammatory and anti-pyretic in their action. In use, they may be formulated with conventional pharmaceutical carriers to form typical dosage units, such as tablets, capsules, solutions, suspensions, suppositories and the like.

It has now been found that the new and novel 5-amino derivatives of 2,4-thiazolidinediones of this invention of the formula:

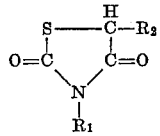

wherein $R_1$ and $R_2$ are as described hereinabove may be prepared by the following reaction sequence.

First, a substituted 2,4-thiazolidinedione of the formula:

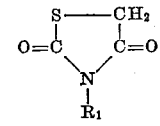

is reacted with bromine to form the corresponding 5-bromo derivative of the formula:

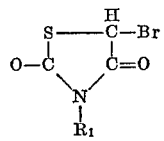

The reaction is carried out at ambient temperature, for example, about 25° C. in a suitable inert solvent, such as chloroform. The bromine is preferably added slowly to the starting material as a solution in an inert solvent, for example, chloroform. The 5-bromo derivative formed is recovered by evaporation of the solvent and may be purified by crystallization.

The 5-bromo compound is then converted to the new and novel 5-amino derivative of this invention by reaction with an amine as follows:

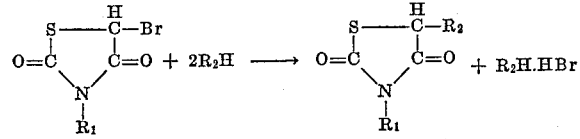

Useful amines included within the scope of the formula $R_2H$ are, for example, pyrrolidine, morpholine, piperidine and the like.

The reaction is normally carried out at ambient temperature in an appropriate inert solvent for the reactants, such as benzene, toluene and the like, with the preferred molar ratio of reactants employed being about two moles of the amine to one mole of the 5-bromo-derivative. During the course of the reaction, the hydrobromide salt of the amine separates and is removed by filtration. The filtrate is then evaporated and the residue purified by crystallization. The final product may, if desired, be converted to a non-toxic pharmaceutically acceptable acid addition salt, for example, the hydrochloride, by treatment with an appropriate acid.

The following example is given in order further to illustrate this invention.

EXAMPLE 1

*3-methyl-5-N-piperidino-2,4-thiazolidinedione*

To a stirred solution of 131 g. (1 mole) of 3-methyl-2,4-thiazolidinedione in 1 liter of chloroform is added dropwise a solution of 160 g. (1 mole) of bromine in 200 ml. chloroform. The solvent is removed by first subjecting the reaction mixture to evaporation at atmospheric pressure and then at reduced pressure so as to yield 3-methyl-5-bromo-2,4-thiazolidinedione in the form of a viscous residue. This viscous product is dissolved in 1.5 liters of benzene and 170.4 g. (2 moles) of piperidine are added slowly to this benzene solution with stirring.

The resulting suspension is then filtered to remove the precipitated piperidino hydrobromide and the filtrate is evaporated to dryness. The dark brown residue obtained is then recrystallized twice from ethanol to yield 3-methyl-5-N-piperidino-2,4-thiazolidinedione in the form of colorless crystals melting at 107–109° C.

Analysis for $C_4H_9N_2O_2S$ (M.W.=214.3)—Calc'd: C=50.44, H=6.58, N=13.07, S=14.97. Found: C=50.33, H=6.61, N=13.35, S=15.15.

It is to be understood that the foregoing detailed description is given merely by way of illustration and that many variations may be made therein without departing from the spirit of my invention.

Having described my invention, what I desire to secure by Letters Patent is:

1. A compound of the formula:

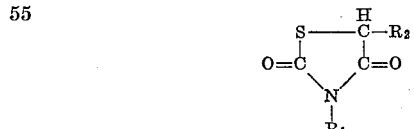

wherein $R_1$ is a member selected from the group consisting of hydrogen and lower alkyl and $R_2$ is a member selected from the group consisting of piperidino, pyrrolidino and morpholino.

2. 3-methyl-5-N-piperidino-2,4-thiazolidinedione.

(References on following page)

References Cited by the Examiner

UNITED STATES PATENTS

| | | | |
|---|---|---|---|
| 2,796,403 | 6/57 | Watson et al. | 260—306.7 |
| 2,823,207 | 2/58 | Nys et al. | 260—306.7 |
| 2,910,478 | 10/59 | Mizzoni | 260—293.4 |
| 2,921,076 | 1/60 | Parcell | 260—293.4 |
| 3,064,003 | 11/62 | Satzinger | 260—306.7 |

OTHER REFERENCES

Groggins: Unit Processes In Organic Synthesis (New York, 1947), page 578.

Wagner et al.: Synthetic Organic Chemistry (New York, 1953), pages 665–670.

NICHOLAS S. RIZZO, *Primary Examiner*.